US011150105B2

(12) United States Patent
Rieb et al.

(10) Patent No.: US 11,150,105 B2
(45) Date of Patent: Oct. 19, 2021

(54) AVIONICS DEVICE, SYSTEMS AND METHODS OF DISPLAY

(71) Applicant: ASPEN AVIONICS, INC., Albuquerque, NM (US)

(72) Inventors: Sean Rieb, Albuquerque, NM (US); Jeffrey Bethel, Albuquerque, NM (US); Tony Malerich, Albuquerque, NM (US); Constantinos Kyriakos, Albuquerque, NM (US); William Brodegard, Albuquerque, NM (US); Penny Heinz, Albuquerque, NM (US); Peter Lyons, Albuquerque, NM (US); David Berlin, Albuquerque, NM (US)

(73) Assignee: Aspen Avionics, Inc., Albuquerque, NM (US)

( * ) Notice: Subject to any disclaimer, the term of this patent is extended or adjusted under 35 U.S.C. 154(b) by 0 days.

(21) Appl. No.: 16/859,629

(22) Filed: Apr. 27, 2020

(65) Prior Publication Data
US 2020/0256702 A1 Aug. 13, 2020

Related U.S. Application Data

(60) Continuation-in-part of application No. 15/013,908, filed on Feb. 2, 2016, now Pat. No. 10,634,514, which
(Continued)

(51) Int. Cl.
*G05D 1/00* (2006.01)
*G01C 23/00* (2006.01)
(Continued)

(52) U.S. Cl.
CPC ............. *G01C 23/00* (2013.01); *G01C 5/005* (2013.01); *G01C 23/005* (2013.01); *G01W 1/00* (2013.01);
(Continued)

(58) Field of Classification Search
CPC ........ G01C 23/00; G01C 5/005; G06F 3/0481
(Continued)

(56) References Cited

U.S. PATENT DOCUMENTS 5,444,618 A * 8/1995 Seki ........................ G06T 17/05
701/532
5,450,323 A 9/1995 Maupillier et al.
(Continued)

FOREIGN PATENT DOCUMENTS

CN 1278941 A 1/2001
CN 101044513 A 9/2007
(Continued)

OTHER PUBLICATIONS

"Aeronautical Computing Technique, Nov. 2006 (1 pg), vol. 36 No. 6".
(Continued)

*Primary Examiner* — Tai T Nguyen
(74) *Attorney, Agent, or Firm* — Kutak Rock LLP

(57) ABSTRACT

The present general inventive concept relates to methods and systems to select and display information on an avionics display screen. The systems and methods allow for the selection and display of information using knobs to highlight and select the desired information for display, eliminating the need for a cursor function. The systems and methods also provide for multiple pages and/or multiple windows or "tiles" within these pages and/or windows simultaneously on a single screen of a display, with each window, page, and/or tile being fully controlled independently when selected. The present general inventive concept also relates to systems and methods to provide multiple cues on an electronic display system altitude tape to a pilot in advance and impending approach to a predefined altitude. The present general inventive concept also relates to systems and
(Continued)

methods to employ variable resolution topographical data based on display range for an avionics navigation display.

8 Claims, 9 Drawing Sheets

Related U.S. Application Data is a continuation of application No. 14/158,545, filed on Jan. 17, 2014, now Pat. No. 9,285,217, which is a division of application No. 12/843,867, filed on Jul. 26, 2010, now Pat. No. 8,643,508, which is a continuation-in-part of application No. 16/215,132, filed on Dec. 10, 2018, now Pat. No. 10,850,864, which is a division of application No. 15/437,315, filed on Feb. 20, 2017, now Pat. No. 10,150,572, which is a continuation of application No. 13/960,138, filed on Aug. 6, 2013, now Pat. No. 9,573,699, which is a division of application No. 12/843,875, filed on Jul. 26, 2010, now Pat. No. 8,502,702.

(60) Provisional application No. 61/367,058, filed on Jul. 23, 2010, provisional application No. 61/367,041, filed on Jul. 23, 2010, provisional application No. 61/228,599, filed on Jul. 26, 2009, provisional application No. 61/228,598, filed on Jul. 26, 2009, provisional application No. 61/228,597, filed on Jul. 26, 2009, provisional application No. 61/228,608, filed on Jul. 26, 2009, provisional application No. 61/228,603, filed on Jul. 26, 2009, provisional application No. 61/228,610, filed on Jul. 26, 2009.

(51) Int. Cl.
*G06F 3/0484* (2013.01)
*G06F 3/0481* (2013.01)
*G06F 3/02* (2006.01)
*G06T 11/60* (2006.01)
*G01W 1/00* (2006.01)
*G06F 16/29* (2019.01)
*G01C 5/00* (2006.01)

(52) U.S. Cl.
CPC .............. *G06F 3/02* (2013.01); *G06F 3/0481* (2013.01); *G06F 3/04842* (2013.01); *G06F 16/29* (2019.01); *G06T 11/60* (2013.01); *Y02A 90/10* (2018.01)

(58) Field of Classification Search
USPC .... 701/1–4, 11, 25; 340/945, 963, 971, 975; 342/26 B, 26 R, 118, 134, 175
See application file for complete search history.

(56) References Cited

U.S. PATENT DOCUMENTS

| | | |
|---|---|---|
| 5,475,594 A | 12/1995 | Oder et al. |
| 5,978,715 A | 11/1999 | Briffe et al. |
| 6,020,832 A | 2/2000 | Jensen |
| 6,038,498 A | 3/2000 | Briffe et al. |
| 6,148,179 A | 11/2000 | Wright et al. |
| 6,154,151 A | 11/2000 | McElreath et al. |
| 6,181,900 B1 | 1/2001 | Lee et al. |
| 6,181,990 B1 | 1/2001 | Grabowsky et al. |
| 6,199,008 B1 | 3/2001 | Aratow et al. |
| 6,281,895 B1 | 8/2001 | Jeong |
| 6,285,298 B1 | 9/2001 | Gordan |
| 6,298,286 B1 | 10/2001 | Ying |
| 6,320,579 B1 | 11/2001 | Snyder et al. |
| 6,381,519 B1 | 4/2002 | Snyder |
| 6,842,122 B1 | 1/2005 | Langner et al. |
| 7,191,406 B1 | 3/2007 | Barber et al. |
| 7,307,549 B2 | 12/2007 | Firra |
| 7,460,029 B2 | 2/2008 | Booman et al. |
| 7,379,796 B2 | 5/2008 | Walsdorf et al. |
| 7,834,779 B2 | 11/2010 | He et al. |
| 8,139,025 B1 | 3/2012 | Krenz |
| 8,264,376 B1 | 9/2012 | McLoughlin et al. |
| 8,502,702 B2 | 8/2013 | Lyons et al. |
| 8,643,508 B2 | 2/2014 | Turner |
| 8,749,594 B2 | 6/2014 | Kyriakos et al. |
| 9,285,217 B2 | 3/2016 | Lyons et al. |
| 9,573,699 B2 | 2/2017 | Lyons et al. |
| 9,694,631 B2 | 7/2017 | Tsuchikawa et al. |
| 10,150,572 B2 | 12/2018 | Lyons et al. |
| 10,634,514 B2 | 4/2020 | Lyons et al. |
| 2002/0077921 A1 | 6/2002 | Morrison et al. |
| 2003/0105579 A1 | 6/2003 | Walter |
| 2003/0130791 A1 | 7/2003 | McIntyre |
| 2003/0214242 A1 | 11/2003 | Berg-Johansen |
| 2004/0160341 A1* | 8/2004 | Feyereisen ............. G01C 23/00 340/970 |
| 2005/0098681 A1 | 5/2005 | Berson et al. |
| 2005/0190142 A1 | 9/2005 | Ferguson |
| 2005/0192717 A1 | 9/2005 | Tafs et al. |
| 2006/0022993 A1 | 2/2006 | Hammond |
| 2006/0244636 A1 | 11/2006 | Rye et al. |
| 2006/0244655 A1 | 11/2006 | Dorneich et al. |
| 2007/0067074 A1 | 3/2007 | Lykken et al. |
| 2008/0184166 A1 | 7/2008 | Getson et al. |
| 2009/0121901 A1* | 5/2009 | Namier ................ G08G 5/0021 340/975 |
| 2010/0211237 A1 | 8/2010 | Nichols et al. |
| 2011/0148749 A1 | 6/2011 | Kyriakos et al. |
| 2012/0001773 A1 | 1/2012 | Lyons et al. |
| 2012/0001774 A1 | 1/2012 | Lyons et al. |
| 2012/0136591 A1 | 5/2012 | Lemense et al. |
| 2013/0314258 A1 | 11/2013 | Lyons et al. |
| 2014/0277856 A1 | 9/2014 | Lyons et al. |
| 2016/0161282 A1 | 6/2016 | Lyons et al. |
| 2017/0158346 A1 | 6/2017 | Lyons et al. |
| 2017/0326927 A1 | 11/2017 | Bill et al. |
| 2019/0112068 A1 | 4/2019 | Lyons et al. |

FOREIGN PATENT DOCUMENTS

| | | |
|---|---|---|
| CN | 101258455 A | 9/2008 |
| CN | 101382968 A | 3/2009 |
| CN | 105222805 A | 1/2016 |
| CN | 105222805 B | 10/2018 |
| CN | 109186629 A | 1/2019 |
| EP | 2048477 A2 | 4/2009 |
| EP | 2460351 B1 | 2/2019 |
| EP | 2460351 B1 | 9/2019 |
| WO | 9915404 A2 | 4/1999 |
| WO | 2008119955 A1 | 10/2008 |
| WO | 2011017063 A2 | 2/2011 |
| WO | 2011017063 A3 | 2/2011 |

OTHER PUBLICATIONS

"Communication pursuant to Article 94{3} EPC received for European Application No. 10806870.1, dated Jun. 14, 2017, 10 Pages."
"Communication Pursuant to Rule 164(1) EPC received for European Patent Application Serial No. 10806870.1 dated Dec. 17, 2014, 07 pages."
"Communication Pursuant to Rule 164(1) EPC received for European Patent Application Serial No. 10806870.1 dated Dec. 23, 2014, 07 pages."
"Communication Pursuant to Rules 70(2) and 70a(2) EPC Received for European Application No. 10806870.1, dated May 12, 2015.", 1.
"Communication under Rule 71(3) received for EP Application No. 10806870.1 dated Mar. 1, 2019, pp. 8".
"Extended European Search Report Received for European Appolication No. 10806870.1, dated Apr. 23, 2015."
"Final Office Action Received for U.S. Appl. No. 12/843,683, dated Aug. 8, 2013, 9 pages".

(56) References Cited

OTHER PUBLICATIONS

"Final Office Action Received for U.S. Appl. No. 15/437,315, dated Apr. 9, 2018, 7 Pages.", 7.

"Final Office Action received for U.S. Appl. No. 14/158,545 dated Mar. 24, 2015, 8 pages".

"First Office Action and English Translation thereof issued by the State Intellectual Property Office (SIPO) of China dated Jul. 1, 2014 in connection with corresponding Chinese Patent Application No. 201080042826.4., 11 pages", 11.

"First Office Action and English Translation thereof issued by the State Intellectual Property Office (SIPO) of China dated Sep. 20, 2017 in connection with corresponding Chinese Patent Application No. 201510612227.6, 14 Pages".

"International Preliminary Report on Patentability and Written Opinion Received for PCT Application No. PCT/US2010/043285, dated Jan. 31, 2012, 7 pages".

"International Search Report and Written Opinion received for PCT Application No. PCT/US2010/043285, dated Jan. 14, 2011, 10 pages", 10.

"Non Final Office Action received for U.S. Appl. No. 15/013,908, dated Jul. 9, 2018, 10 pages".

"Non Final Office Action Received for U.S. Appl. No. 15/437,315, dated Aug. 24, 2017, 5 pages", 5.

"Non-Final Office Action Received for U.S. Appl. No. 16/215,132, dated Sep. 5, 2019, 11 pages".

"Non-Final Office Action received for U.S. Appl. No. 12/843,683, dated Dec. 10, 2012, 8 pages".

"Non-Final Office Action received for U.S. Appl. No. 12/843,867, dated Jan. 22, 2013, 9 Pages."

"Non-Final Office Action received for U.S. Appl. No. 13/960,138, dated Jun. 25, 2015."

"Non-Final Office Action received for U.S. Appl. No. 13/960,138, dated Mar. 22, 2016".

"Non-Final Office Action received for U.S. Appl. No. 14/158,545 dated Dec. 4, 2014, 8 pages", 8.

"Notice of Allowance received for U.S. Appl. No. 16/215,132, dated Feb. 20, 2020, pp. 7", 7.

"Notice of Allowance Received for U.S. Appl. No. 12/843,683, dated Feb. 3, 2014, 5 pages", 5.

"Notice of Allowance Received for U.S. Appl. No. 12/843,867, dated Sep. 25, 2013, 8 Pages."

"Notice of Allowance Received for U.S. Appl. No. 12/843,875, dated Apr. 8, 2013, 9 pages".

"Notice of Allowance received for U.S. Appl. No. 13/960,138, dated Jun. 17, 2014, 9 pages".

"Notice of Allowance received for U.S. Appl. No. 13/960,138, dated Oct. 29, 2014, 2 pages", 2.

"Notice of Allowance Received for U.S. Appl. No. 15/013,908, dated Dec. 17, 2019, 8 pages", 8.

"Notice of Allowance Received for U.S. Appl. No. 15/013,908, dated Sep. 5, 2019, 24 Pages."

"Notice of Allowance received for U.S. Appl. No. 15/437,315, dated Aug. 3, 2018, 8 pages".

"Notice of Allowance received for U.S. Appl. No. 14/158,545 dated Nov. 2, 2015, 8 pages", 8.

"Notification of Grant of Patent and English Translation thereof issued by the State Intellectual Property Office (SIPO) of China dated Jul. 8, 2015 in connection with corresponding Chinese Patent Application No. 201080042826.4, 3 pages", 3.

"Notification of Grant received for Chinese Patent Application Serial No. 201510612227.6 dated Jul. 2, 2018, 4 pages", 4.

"Second Office Action and English Translation thereof issued by the State Intellectual Property Office (SIPO) of China dated Feb. 2, 2015 in connection with corresponding Chinese Patent Application No. 201080042826.4, 14 pages", 14.

"Supplementary Partial European Search Report EP Application No. 10806870.1 (dated Dec. 17, 2014)".

U.S. Appl. No. 13/960,138 , "Notice of Allowance received for U.S. Appl. No. 13/960,138, dated Oct. 4, 2016, 12 pages", Oct. 4, 2016, 12.

Lyons, Peter , et al., "Final Office Action Received for U.S. Appl. No. 15/013,908, dated Feb. 19, 2019, 7 pages", Jun. 9, 2016.

\* cited by examiner

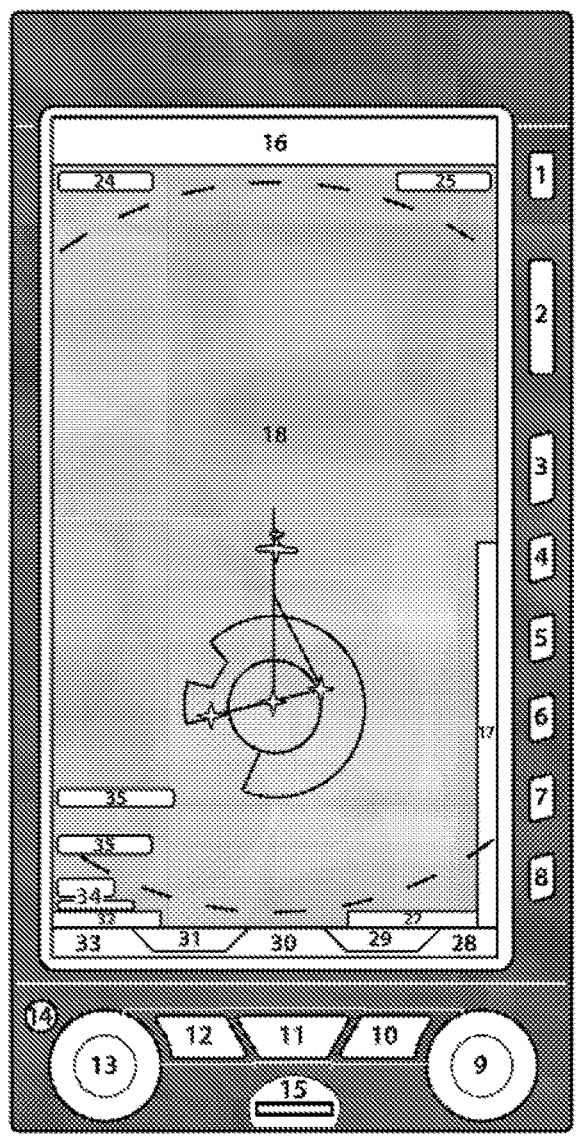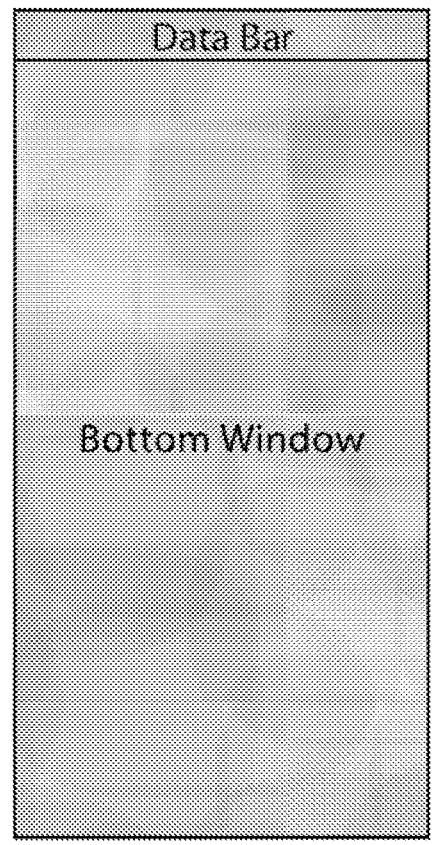
FIG. 6A
FIG. 6B

| Marker Color | Description | |
|---|---|---|
| Green | The aircraft is 500 feet above selected MINIMUM. | <br>Minimums Green Triangle |
| Hollow Yellow | The aircraft is between 200 and 100 feet above the selected MINIMUM. The marker base is at 100 feet above MINIMUM, and the tip is at 200 feet above MINIMUM. | <br>Minimums Yellow Triangle |
| Red Striped | The aircraft is at the selected MINIMUM. | <br>Minimums Red Striped Triangle |

FIG. 9

AVIONICS DEVICE, SYSTEMS AND METHODS OF DISPLAY

CROSS-REFERENCES

This application is a continuation-in-part application of co-pending Non-Provisional patent application Ser. No. 15/013,908, filed Feb. 2, 2016, (the '908 application) now U.S. Pat. No. 10,634,514, which is a continuation application of co-pending Non-Provisional patent application Ser. No. 14/158,545, filed Jan. 17, 2014 (the '545 application), now U.S. Pat. No. 9,285,217, which is a divisional application of U.S. Non-Provisional patent application Ser. No. 12/843,867, filed Jul. 26, 2010 (the '608 application), now U.S. Pat. No. 8,643,508, the entire disclosures of which are incorporated herein by reference. The '608 application claims the benefit of, and priority based upon, U.S. Provisional Patent Applications Ser. No. 61/228,608, entitled "Information Page Selection System and Method"; Ser. No. 61/228,599, entitled "Altitude Marker System and Method"; Ser. No. 61/228,598, entitled "Multifunction Avionics Display User Interface Method"; and Ser. No. 61/228,597, entitled "Dynamic Topography Resolution System and Method of Display", all four filed Jul. 26, 2009; and U.S. Provisional Patent Applications Ser. No. 61/367,041, entitled "Avionics Display"; and Ser. No. 61/367,058, entitled "Avionics Display", both filed Jul. 23, 2010, the entire disclosures of which are herein incorporated by reference. This application is also a continuation-in-part application of co-pending Non-Provisional patent application Ser. No. 16/215,132, filed Dec. 10, 2018, (the '132 application), which is a divisional application of co-pending U.S. patent application Ser. No. 15/437,315, filed Feb. 20, 2017, now U.S. Pat. No. 10,150,572, which is a continuation application of U.S. patent application Ser. No. 13/960,138, filed Aug. 6, 2016, now U.S. Pat. No. 9,573,699, which is a divisional application of U.S. patent application Ser. No. 12/843,875, filed Jul. 26, 2010, now U.S. Pat. No. 8,502,702, which claims priority pursuant to 35 U.S.C. 119(e) to U.S. Provisional Patent Application Ser. No. 61/228,610, filed Jul. 26, 2009 and entitled "Reversionary Architecture System and Method," 61/228,603, filed Jul. 26, 2009 and entitled "Pitot Pressure Sensing System and Method," 61/367,041, filed Jul. 23, 2010 and entitled "Avionics Display," and 61/367,058, filed Jul. 23, 2010 and entitled "Avionics Display," the entire disclosures of which are herein incorporated by reference.

BACKGROUND

1. Field

The present general inventive concept relates to avionics devices, displays, and systems and methods of display for avionics devices. More particularly the inventive concept relates to methods and systems to select and display information on a display screen. The systems and methods allow for the selection and display of information using knobs to pan to desired location and to highlight and select the desired information for display, eliminating the need for a cursor function. The systems and methods also provide for multiple pages and/or multiple windows or "tiles" within these pages and/or windows simultaneously on a single screen of a display, with each window, page, and/or tile being fully controlled independently when selected. The present general inventive concept also provides methods and systems to navigate through the windows, tiles and/or pages.

The present general inventive concept also relates to systems and methods to provide multiple cues on an electronic display system altitude tape to a pilot in advance and impending approach to a predefined altitude. These systems and methods provide heightened safety by providing cues that operate in unison thereby increasing a pilot's situation awareness of an approaching critical altitude for flight and/or giving pilots an increased sense of rate of change in altitude during an approach to a critical altitude for flight.

The present general inventive concept also relates to systems and methods to employ variable resolution topographical data based on display range for an avionics navigation display. The present general inventive concept uses a smooth zoom between ranges. Both effects result in what appears to be a constant resolution smooth zoom while changing screen range.

2. Description of the Related Art

Conventional avionics displays use an X, Y cursor function to access items on avionics screens like airports, VOR's, and weather information based on down-linked reports such as METARS, AIRMETS, SIGMETS.

Conventional avionics displays are limited to providing a single function for a single page. Pop up displays are provided on some conventional avionics systems. These pop-up displays have limited functionality and cannot display other screens. Secondary information associated with a page that is not being displayed is displayed on a primary display page with the secondary function's data changed and combined into the primary display page and not represented as the original page and data. The secondary data is displayed and is not changeable by the user of these conventional displays.

Conventional systems use one selectable cue or bug to indicate to the pilot a selected altitude. This is problematic at least because the pilot must be prepared to make adjustments in an aircraft's heading immediately when the pilot receives the cue. Thus, a pilot who is not observing the particular system or otherwise is not waiting for the cue may result in passing the selected altitude thereby requiring altitude correction.

Conventional avionics displays currently are limited to one resolution, or at the most, limited to two (2) levels of resolution of topographical data for the terrain depiction on a navigation map. Conventional avionics displays do not store more than one level of terrain resolution in RAM and are limited in displaying terrain data by the transfer rates of the data storage device. This limitation of conventional displays results in an abrupt "step" or "jerk" in the display when a user of the conventional display switches from one resolution to another.

SUMMARY

The present general inventive concept relates to methods and systems to select and display pertinent information regarding aeronautical and weather items on a display screen showing geographical representation of an area. The methods and systems allow for the selection and display of information using knobs to pan to desired location and to highlight and select the desired information for display overlaid on the geographical display. The present general inventive concept eliminates the need for a cursor function to perform these functions.

The present general inventive concept also relates to methods and systems to display multiple pages and/or multiple windows or "window tiles" within these pages and/or windows. This allows an Avionics Multi-Function Display ("MFD") to include several functions displayed simultaneously on a single screen, each function capable of being fully controlled independently when selected. The present general inventive concept also provides a method to navigate through the tiles on the Multi-Function Avionics Display.

The present general inventive concept also relates to a system and method to provide multiple cues on an electronic display system altitude tape to a pilot in advance and impending approach to a predefined altitude. The present general inventive concept provides for heightened safety by providing cues that operate in unison thereby increasing a pilot's situation awareness of an approaching critical altitude for flight.

The present general inventive concept also provides a display having multiple levels of terrain resolution with smooth transitions there between.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

These and/or other aspects and utilities of the present general inventive concept will become apparent and more readily appreciated from the following description of the embodiments, taken in conjunction with the accompanying drawings. For the purpose of illustration, forms of the present general inventive concept which are presently preferred are shown in the drawings; it being understood, however, that the general inventive concept is not limited to the precise arrangements and instrumentalities shown. In the drawings:

FIG. 6A is a system of another exemplary embodiment of the present general inventive concept showing a single page on a multifunction avionics display.

FIG. 6B is a schematic view of an avionics display as in FIG. 6A.

FIG. 9 is a table showing markers on an altitude tape associated with a minimums alert.

DETAILED DESCRIPTION

This general inventive concept provides methods of displaying information on an avionics device display. Selectable items, and information relating to the selectable items are displayed on the device display screen. The information relating to the selectable items is derived from a source. Examples of sources of information include Navigation Map (Airports, controlled airspace, special use airspace, navigation aids, cultural features, geographic features), METAR, AIRMET/SIGMET, and TFR weather pages. In one embodiment, the information source is stored internally within the avionics device. In another embodiment, the information source is stored at a location remote to the avionics device.

The general inventive concept maintains a dynamically variable database of the selectable items. In one embodiment the database is stored in RAM. In another embodiment, the database is stored on a removable SD memory card, with relevant portions being dynamically stored in RAM. In another embodiment, the database is dynamically maintained at a remote location with periodic update broadcasts being received via satellite signal, such as XM.

The database is accessible by a control processor of the device. The database is updated dynamically to include selectable items only within a predetermined area. In one embodiment, the database is updated dynamically by excluding items outside of the predetermined area. In some embodiments, the predetermined area is updated dynamically, and is based on location of an aircraft. If the aircraft is moving, the predetermined area and the database is dynamically updated to correspond to the location of the aircraft (i.e., roving map). In some embodiments, the predetermined area corresponds to the viewable area of the device display screen. In some embodiments, the predetermined area extends just beyond the viewable area of the display screen.

The database is updated dynamically. In some embodiments, the database is updated by modifying one or more of the selectable items and/or the information relating to the items. In some embodiments, the database is updated by removing and/or adding one or more of selectable items and/or the information relating to the items.

The general inventive concept enables selection of items and/or information in a sequential manner. In some embodiments, the items and/or information is selected by incrementally advancing forward and backward through the database via rotation of a control knob. In some embodiments, the items and/or information is selected by pressing a control knob.

Figure 1:
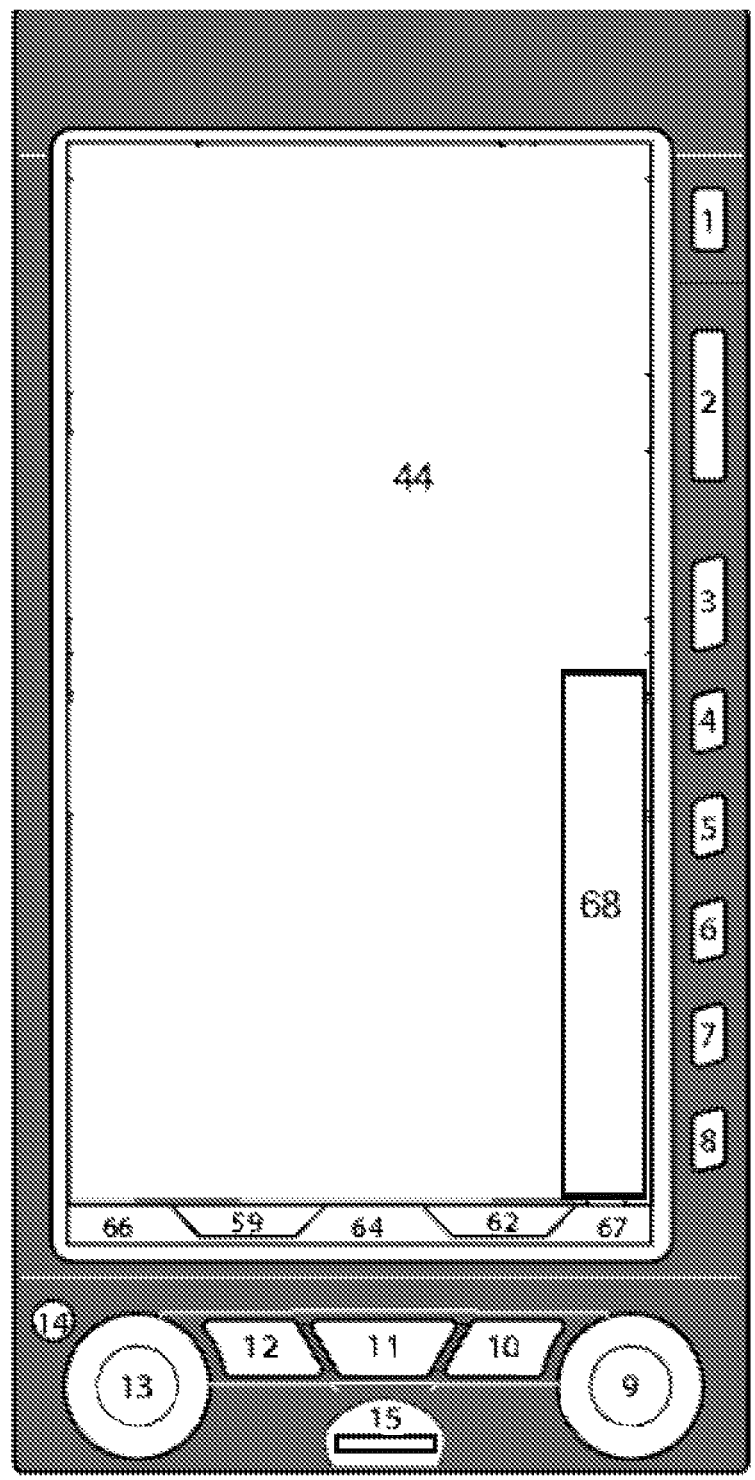
FIG. 1 is a system of an exemplary embodiment of the present general inventive concept having a display, screen, and knobs.

Referring to the accompanying Drawings, FIG. 1 represents an exemplary embodiment of the present general inventive concept having a display, screen, and knobs. The general inventive concept provides for a selection of individual elements on a screen 1-44 through the use of two knobs 1-13 and 1-9 and a plurality of buttons 1-1, 1-2, 1-3, 1-4, 1-5, 1-6, 1-7, 1-8, 1-10, 1-11, 1-12, as illustrated in FIG. 1. The function of the buttons and the knobs varies depending on which window or page is displayed. The function of the left knob 1-13 is indicated by the label toward the bottom of the screen 1-66. The function of the right knob 1-9 is indicated by the label toward the bottom of the screen 1-67. The function of the left button 1-12 is indicated by the label toward the bottom of the screen 1-59. The function of the center button 1-11 is indicated by the label toward the bottom of the screen 1-64. The function of the right button 1-10 is indicated by the label toward the bottom of the screen 1-62.

FIG. 1 also shows five hot keys 1-4, 1-5, 1-6, 1-7, and 1-8 to the right of the screen 1-44 which may be used to toggle various features on and off. The function of each hot key 1-4, 1-5, 1-6, 1-7, and 1-8 is indicated by the label on the screen 1-44 to the left of each button 1-68. Three additional buttons above the hot keys control entering and exiting the main menu 1-3, setting and/or adjusting the map range 1-2, and reversion or manual power control 1-1. FIG. 1 also shows an automatic dimming photocell 1-14 and a microSD card slot 1-15.

In the embodiment shown in FIG. 1, the display is equipped with several pilot controls designed to simplify operation of the system, minimize pilot workload, and reduce the time required to access functionality. The left knob 1-13 and the right knob 1-9 are both configured such that it may be pushed and/or rotated. Pressing the knob activates it for control, and subsequent presses cycle through its available control functions in a round-robin sequence. In some embodiments, each knob 1-9 and 1-13 has an inactive home state to which it returns automatically after a period of time of inactivity, for example, 10 seconds. The inactive state is designed to prevent inadvertent adjustment of a setting. The knobs may be used to select a different page, window, or view or move horizontally and vertically when panning a map.

In the embodiment shown in FIG. 1, rotating the left knob 1-13 selects a different page for display. The initial rotation of the knob activates the selection process, and continued rotation will select different pages. This feature helps to minimize inadvertent page changes. In some functions, for example in map view, pressing the left knob 1-13 activates panning mode. When panning mode is active the left knob 1-13 scrolls horizontally across the map. When in the secondary horizontal situation indicator view the left knob 1-13 performs a sync function for the current course setting. When the info button is pressed, rotating the left knob 1-13 selects different objects on the Navigation Map (Airports/VORs) or METAR, AIRMET/SIGMET, and TFR weather pages. Pressing the left knob 1-13 after the info button has been pressed will display the selected object's textual information, when available.

In the embodiment shown in FIG. 1, pressing the right knob 1-9 moves the focus and selects different windows on a page. When a window has focus, rotating the right knob 1-9 changes the view of the window. If the right knob 1-9 is not pushed (to activate window selection) the initial rotation of the right knob 1-9 will activate the selection process, and continued rotation will select different windows. This feature helps to minimize inadvertent page changes.

The right knob 1-9 is also used to back up through multiple information pages. The label push for back displays above the right knob 1-9 when this feature is available. Pushing the right knob 1-9 will back the display out of information and panning, one level at a time, to return to the basic view.

Figure 2:
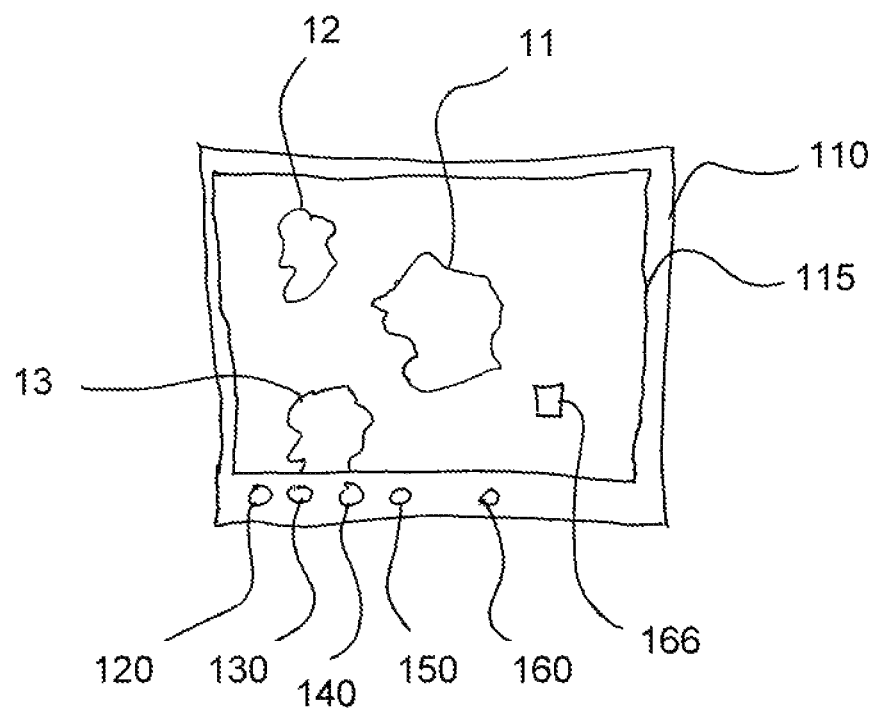
FIG. 2 is a system of another exemplary embodiment of the present general inventive concept having a display, screen, and knobs.
Figure 3:
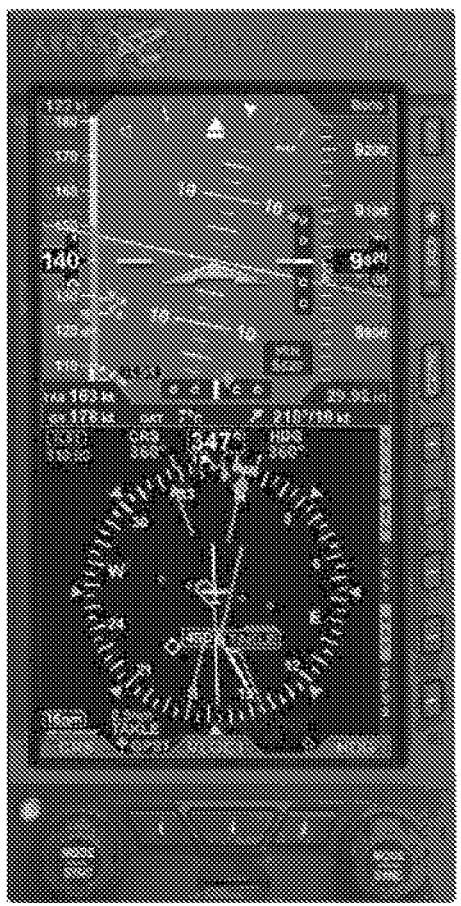
FIG. 3 is a system of another exemplary embodiment of the present general inventive concept having a display, screen, and knobs.
Figure 4:
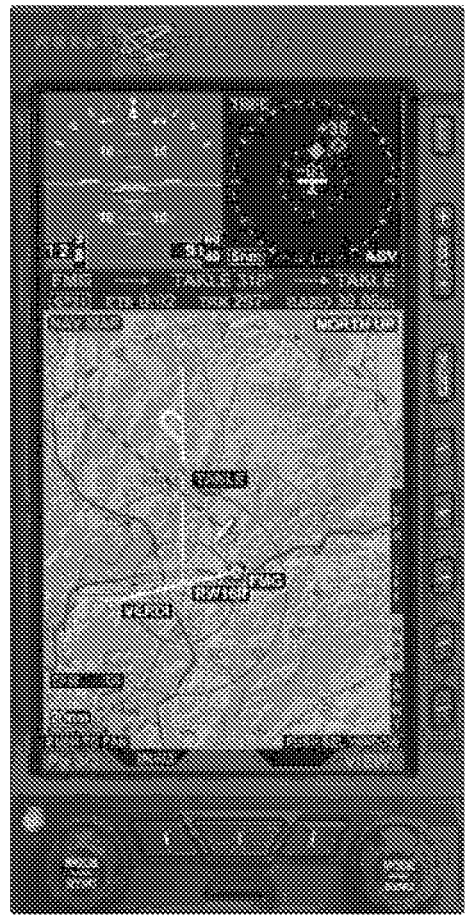
FIG. 4 is a system of another exemplary embodiment of the present general inventive concept having a display, screen, and knobs.

FIG. 2 shows another exemplary embodiment of the present general inventive concept having a display, screen, and knobs. FIG. 3 shows an embodiment of the present general inventive concept where the avionics display is a primary flight display and includes an attitude display and a navigation display separated by a data bar. FIG. 4 shows an embodiment of the present general inventive concept where the avionics display is a multifunction flight display and includes a secondary attitude display at the top left of the screen, a traffic display at the top right of the screen, and a navigation map at the bottom half of the screen.

Referring to FIG. 2, the knobs 120, 130 provide movement of the display 115 in vertical, i.e., up and/or down, and/or horizontal dimensions, i.e., left and/or right. For instance, knob 120 may be assigned to control vertical movement and knob 130 may be assigned to control horizontal movement of the display 115.

Once the desired area of display 115 is shown, the selection of the individual components in the selected geographical area is performed by pressing the button 140 to activate a knob 150 that highlights a component 166, such as, an airport, radio, or weather component. The component 166 selected is then highlighted on the screen.

Additional information related to the component 166 may then be selected for display by pushing the left knob 120. The information provided represents all of the information pertinent to the selected component 160. The user can continue to select other component's information by rotating the left knob 120.

The implementation of this method for AIRMETS and SIGMETS starts with a selection key 160 named "Details" on the page used to display these items. When this key is pressed, one of the AIRMETS or SIGMETS symbols or areas on the screen is highlighted.

One of the control knobs is labeled "Select." Turning this knob chooses the next item on the screen and highlights it. The implementation has an intelligent software algorithm that, in one embodiment, selects the items on the screen sequentially from top left to lower right as the selection knob is turned. In another embodiment, the items on the screen are selected sequentially based on their relative distance for the aircraft.

Once the desired item is selected, pressing the knob labeled "Press for Info" brings up a text window with all information for that item displayed in this window. The window also implements a scroll function if the data to be displayed is longer than one page.

The MAP info page function works in a similar fashion to display specific data on screen items such as airports. It has a few enhancements to the original AIRMET, SIGMET page. Once the screen item is highlighted, a small window follows that highlight with some of the most important information for that item displayed immediately.

The full information is still accessed in the same manner by selecting info, bringing up the large text page.

Once the large text page is brought up, display side keys are enabled to allow the user to selectively access specific information about that airport, separately on the screen. For instance, general airport information is displayed by pressing the APT side key. Radio frequencies are displayed using the FREQ side key, etc.

The implementation of this method for METARS has an additional feature. The symbols on the screen that are selected in this method for this page are small. An additional enhancement was made to temporarily enlarge the selected item on the screen to make it more visible. The rest of the detail information is displayed using the same method described above.

The exemplary embodiment of the present general inventive concept is implemented as a software algorithm, e.g., computer readable codes, on a computer readable medium, such as a firmware stored in the memory of the electronic avionics device of FIG. 1, and/or of the electronic avionics devices shown and described in U.S. Provisional Patent Application Ser. No. 61/367,041, entitled "Avionics Display", filed Jul. 23, 2010, or U.S. Provisional Patent Application Ser. No. 61/367,058, entitled "Avionics Display", filed Jul. 23, 2010 (the entire disclosures of which are incorporated herein by reference). For example, the electronic avionics display might include the Electronic Flight Data Display Instrument disclosed in U.S. patent application Ser. No. 11/773,419, the entire disclosure of which is herein incorporated by reference. For instance, a setup procedure may be stored in a database such that, upon request by a user, the setup requests assignment information for each of the control buttons 120-160. Depending on the inputted data, the present general inventive concept will assign a function to each of the control buttons 120-160.

The present general inventive concept provides fully independent operation of multiple windows or "window tiles" through the selection of that tile using a knob selector. Once a window tile is selected by the knob, full functionality associated with that window tile is provided. The application running in the selected window tile can be changed to any window tile application in the system with some exceptions limited by FAA regulations.

The general inventive concept provides a method of displaying information on an avionics device display. The method includes selecting a device display configuration. The device display is capable of being configured to display one or more display tiles simultaneously. By employing object-oriented programming techniques, with each tile representing an independent object, each tile is capable of operating a function, or running an application, independent of other displayed tiles. Each tile is also capable of updating information displayed in real-time. A function or application is associated with each tile displayed in the selected display configuration. Although the figures show the general inventive concept including options for one, two, or three tiles and a limited number of exemplary functions, or applications, that may be assigned to each tile, one skilled in the art will appreciate that any number of tiles may be employed and any number of applications may be optionally assigned, while still falling within the scope of the claimed invention.

Figure 5:
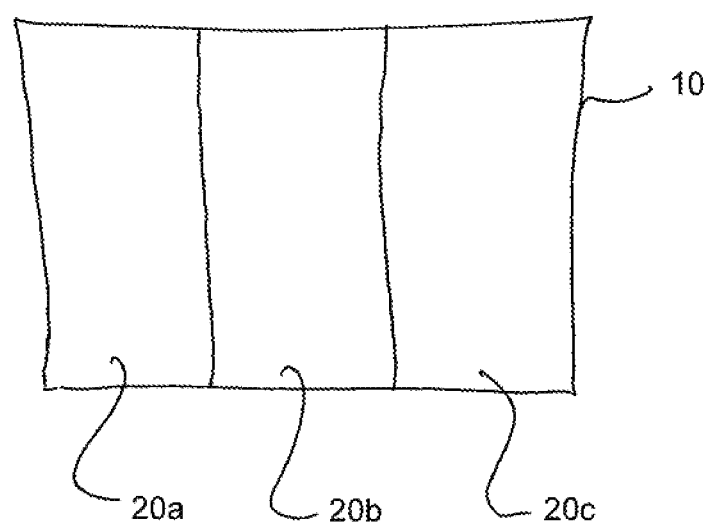
FIG. 5 is a system of another exemplary embodiment of the present general inventive concept showing multiple pages on a multifunction avionics display.

Referring to FIG. 5, the present general inventive concept can be customized to have a set of multiple screen layouts in a display 5-10. In this embodiment, each screen layout has 1, 2 or 3 windows or tiles, e.g., for example, the display 5-10 has 3 tiles, 5-20A, 5-20B, and 5-20C. It is foreseen, however, that other combinations can be used depending on screen size. In other words, a larger screen will accommodate more tiles. The present general inventive concept can be set during an initial setup procedure to display more tiles if the display is larger or to display fewer tiles if the display is smaller. For instance, in some embodiments the setup procedure requests information related to display screen size. In some such embodiments, a number of tiles is determined based on the display screen size.

This general inventive concept also provides methods to navigate between screens, windows, select functions within each window, and control those functions for each window, using the knobs and buttons, as described above. The present general inventive concept allows multiple screen layouts that a user can select.

Referring to FIG. 6A, another embodiment of the general inventive concept is provided. In FIGS. 6A and 6B, a single window full-screen layout fills the entire screen of the display. This window may be used to display one of the following views: Navigation Map (NAV MAP), Terrain (TERR), Traffic (TRFC), Lightning Sensor (STRIKES), Data Link Weather (WEATHER), or others.

Figure 7A:
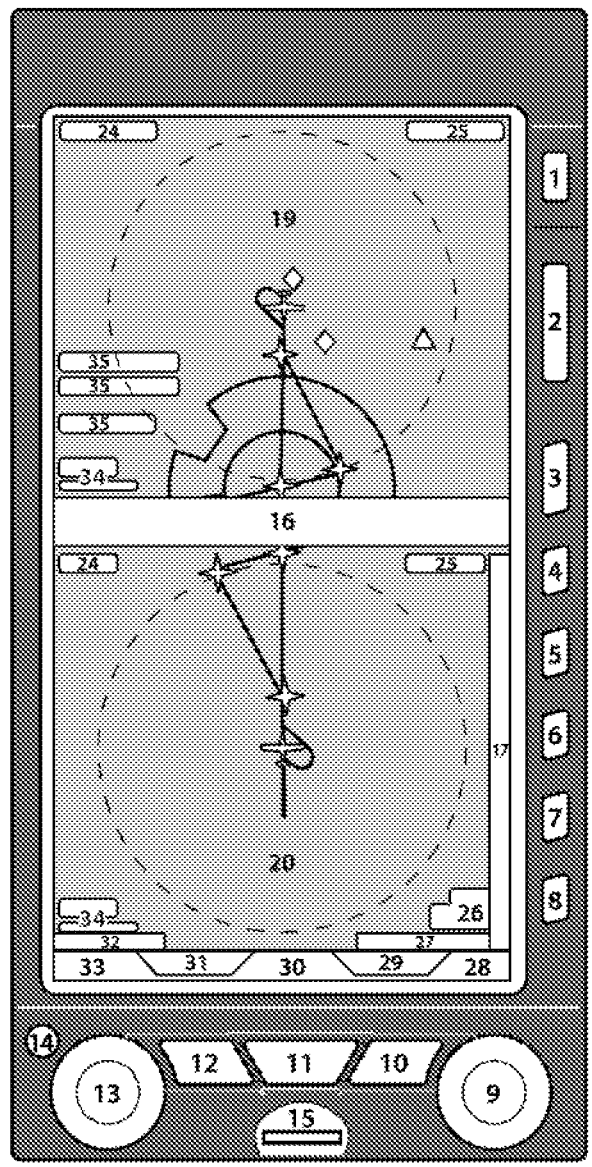
FIG. 7A is a system of another exemplary embodiment of the present general inventive concept showing multiple pages on a multifunction avionics display.
Figure 7B:
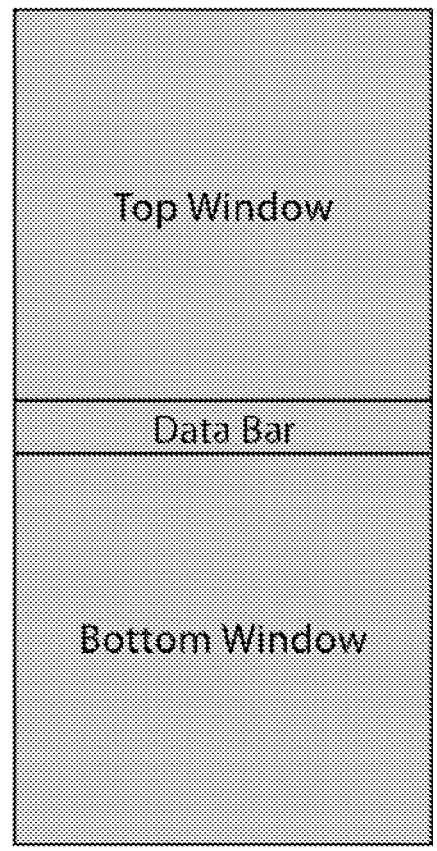
FIG. 7B is a schematic view of an avionics display as in FIG. 7A.

Referring to FIG. 7A, another embodiment of the general inventive concept is provided. In FIGS. 7A and 7B, the display includes a two window, split screen layout. In FIG. 7A, the VFR navigation map view is displayed in the top window with the dedicated terrain view displayed in the bottom window. The top window may be used to display one of the following views: Terrain (TERR), Traffic (TRFC), Lightning Sensor (STRIKES), or others. The bottom window may be used to display one of the following views: Navigation Map (NAV MAP), Terrain (TERR), Traffic (TRFC), Lightning Sensor (STRIKES), Data Link Weather (WEATHER), Secondary HSI, or others.

Figure 8A:
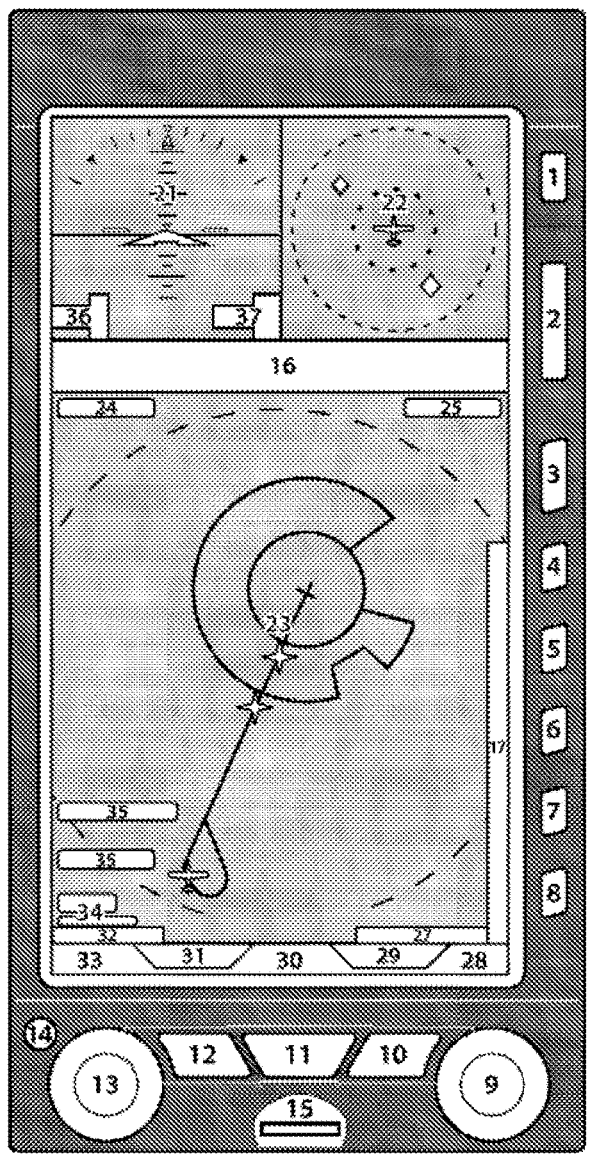
FIG. 8A is a system of another exemplary embodiment of the present general inventive concept showing multiple pages on a multifunction avionics display.
Figure 8B:
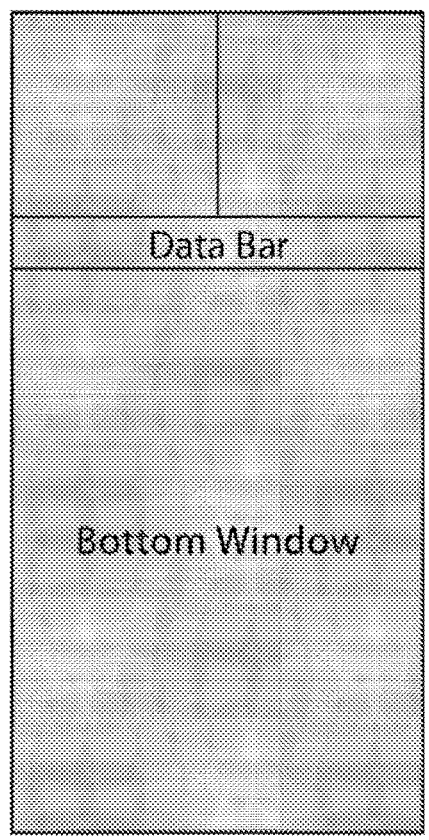
FIG. 8B is a schematic view of an avionics display as in FIG. 8A.

Referring to FIG. 8A, another embodiment of the general inventive concept is provided. In FIGS. 8A and 8B, the display includes a three WINDOW, Thumbnail LAYOUT. In FIG. 8A, the Secondary Attitude Indicator VIEW is displayed in the top left WINDOW, Dedicated Terrain VIEW in the top right WINDOW, and VFR Navigation Map VIEW in the bottom WINDOW. The top left window may be used to display one of the following views: Terrain (TERR), Traffic (TRFC), Lightning Sensor (STRIKES), Secondary Attitude Instrument, or others. The top right window may be used to display one of the following views: Terrain (TERR), Traffic (TRFC), Lightning Sensor (STRIKES), or others. The bottom window may be used to display one of the following views: Navigation Map (NAV MAP), Terrain (TERR), Traffic (TRFC), Lightning Sensor (STRIKES), Data Link Weather (WEATHER), or others.

The present general inventive concept also provides different shaped markers on an altitude tape found on a Primary Flight Display (PFD) and/or Multifunction Flight Display (MFD) of an aircraft. The markers operate in unison to provide the pilot data at, for example, 500 feet, 200 feet, and the pilots desired or "target" altitude.

Methods of the general inventive concept are provided. A target altitude is input into the device. The target altitude is stored in a database. One or more alert altitudes are calculated based on predetermined deviations from the target altitude that has been inputted into the device and stored in the database. One or more marker corresponding to the alert altitude(s) are displayed.

In some embodiments, the markers are displayed on an electronic avionics device display screen. In some embodiments, the markers are displayed so as to correspond to an electronic altitude tape. In some embodiments, the predetermined deviations are stored in a database. In some embodiments, a user can modify the predetermined deviations, thus selecting his or her own alert markers. In some embodiments, the predetermined deviations are preset and cannot be modified. For example, and not by way of limitation, one embodiment includes a predetermined deviation (and alert marker) preset at 500 feet above the target altitude. In another example, a predetermined deviation (and alert marker) is preset at 200 feet above the target altitude. In one embodiment, the general inventive concept includes only one marker corresponding to only one alert altitude.

Referring to the Table in FIG. 9, one embodiment of the general inventive concept includes a 500 foot marker (green marker), 200 foot marker (yellow marker), and target marker (orange or red/yellow striped marker).

Figure 10:
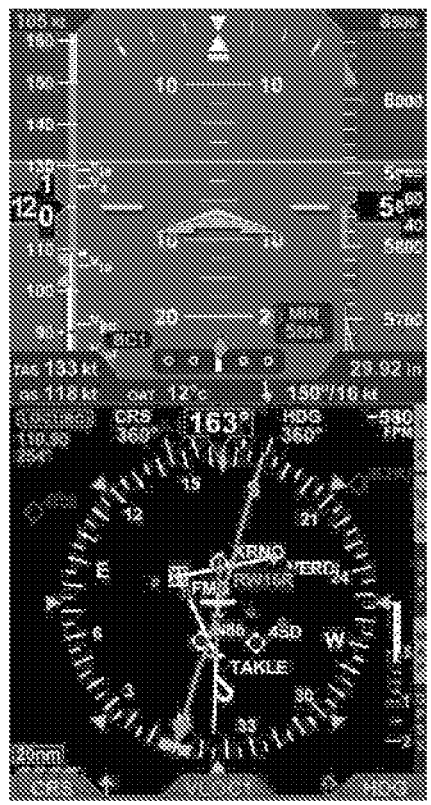
FIG. 10 is a system of another exemplary embodiment of the present general inventive concept showing markers on an altitude tape associated with a minimums alert.

Referring to FIG. 10, a PFD is shown with the altitude tape along the right side of the top window. The target (minimum) altitude in the example shown in FIG. 10 is 5520 feet. FIG. 10 shows a marker (green triangle) at 500 feet above the target (6020 feet) toward the top of the altitude tape. FIG. 10 also shows top of a second marker (top of a hollow yellow triangle) at 200 feet above the target (5720 feet) and the triangular marker would extend down to 100 feet above target (5620 feet). Not shown in FIG. 10, a third marker (orange or yellow/red striped triangle) would be included at the target (minimum) altitude of 5520 feet.

The markers or cues may be of different shape and/or color displaced from the target altitude based on the importance of the reference altitude, for example, enroute level, approach minimums, and the like. In one embodiment, the marker extends along a range of altitude that includes the alert altitude. In one embodiment, the marker extends along a range from 200 feet above the target altitude to 100 feet above target altitude. In one embodiment, the marker is a gradient, or triangle, to become more apparent to a user as the target altitude draws nearer. In one embodiment, one of the markers corresponds to the target altitude on the electronic altitude tape.

One skilled in the art will appreciate that many different markers are possible. For example, the marker could include an audible alert, like a tone or an alarm bell. The marker could include a visual alert, like a flashing light. The marker could include both an audible and visual alert, together.

The exemplary embodiment of the present general inventive concept is implemented as a software algorithm, e.g., computer readable codes, on a computer readable medium. For instance, the target markers and shape, color, outlined, solid, ghost, transparency, and/or other like characteristics thereof, may be stored in a database such that, upon request by a user, the setup requests information related to target altitude. Depending on the inputted data, the present general inventive concept will determine the target marker and characteristics thereof to display on a screen.

The present general inventive concept also relates to an avionics device display having multiple levels of terrain database resolution with smooth transition from one range displayed on a device display screen to a second range displayed on a device display screen. In one embodiment, the location of the aircraft is tracked utilizing a global positioning system (GPS) and updated regularly, preferably about every 5 minutes. Multiple levels of terrain database resolution are stored in a database. In exemplary embodiments, terrain database resolution database is stored on a removable SD memory card located in a card slot of the device. When the location of the aircraft is updated, specific data from the terrain database resolution database is retrieved and stored in random access memory (RAM).

The present general inventive concept stores in RAM, all topographic data required to fill the display screen, from a database for each of the settings for each resolution. The data retrieved from the terrain database resolution database and stored in RAM is based on the location of the aircraft and limited in range (i.e. distance from the aircraft). Depending on the level of terrain database resolution, a greater or lesser range of data is retrieved and stored in RAM. A higher terrain database resolution data set will be retrieved for a shorter range (i.e., zoomed in) and a lower terrain database resolution data set will be retrieved for a larger range (i.e., zoomed out). When data from the terrain database resolution database is retrieved and stored in RAM, data is retrieved relating to every one of the multiple levels of terrain database resolution, each level including a different range. Thus, at any given time, the RAM will store terrain data in concentric circles around the location of the aircraft, with the highest resolution data being the terrain data concentric circle closest to the location of the aircraft and the lowest resolution data being the terrain data concentric circle farthest from the location of the aircraft. As the location of the aircraft changes over time, the data stored on RAM is discarded and/or replaced by updated terrain data from the terrain database resolution database.

Terrain information is displayed on the device display. Terrain data of one range and level of resolution from RAM is provided to a graphics processor. Which level of resolution and range is provided to the graphics processor is determined based upon screen size, screen shape, range to be displayed on the screen, and other factors. The graphics processor processes and optimizes (shrinks, expands, extrapolates, or otherwise) the data for display based on screen size, shape and other factors. For example, if the range to be displayed on the screen is very tight or very close to the location of the aircraft, then the highest level of terrain resolution and shortest range of terrain data is used. On the other hand, if a large range is to be displayed on the screen, then a lower level of terrain resolution and longer range of terrain data is used. For example, one embodiment includes five (5) levels of resolution 300, 90, 30, 9, and 3 arc-second and each of these levels of resolution are keyed to the level of range on the screen.

When zooming between ranges, the present general inventive concept creates smooth transition to higher resolution from a lower resolution, and/or vice-versa, i.e., from lower resolution to higher resolution instead of a step jerk function. The smooth transition is provided for a number of display features, including terrain, on the screen, rather than just jumping to the next range. In other words, as terrain is displayed and being viewed in a first screen resolution by a user, the user may desire to view the terrain in a higher screen resolution and switches a controller to select and transition to a higher screen resolution.

To transition between ranges displayed on the device display (i.e., to zoom in or out), the present general inventive concept implements a smooth zoom function. The smooth zoom function increases (or decreases) the range displayed on the screen using gradually increasing or decreasing increments. The topographical resolution part of the algorithm switches from one terrain database resolution database to the next (up or down, depending on whether zooming in or out) instantly and dynamically at some point during the transition, if necessary for optimal graphics display. The incremental range increases (or decreases) change as a decay filter function over a constant time interval. For example, if the incremental range increase (or decrease) is constant over time (i.e., increases or decreases by 1 nautical mile every second), then the decay filter function is linear. In other examples, the incremental range increase (or decrease) is exponential or double exponential over constant time. For instance, if a user begins at a fixed range setting of 10 nm and increment the range through the next 2 fixed settings, 15 nm and 20 nm, the present general inventive concept will increment from 10 nm to 20 nm smoothly in small steps of 1 nm initially and several nm/sec as it approaches the 20 nm screen resolution. The topographical resolution part of the algorithm will switch from 3 arc seconds terrain database resolution to 9 arc seconds terrain database resolution instantly when the range passes through 16 nm. The transition appears as a smooth zoom to the user.

The present general inventive concept stores terrain data in RAM that is centered at the location of the aircraft, plus a buffer amount around the edges of the screen to allow the aircraft to move at maximum certified speed for its equipment and provide a sufficient amount of time to extract the next set of topographical data from the database. A map panning feature is also included in one embodiment such that the terrain database resolution data stored in RAM is based on coordinates provided by a user, rather than on the location of the aircraft. Coordinates are provided either manually by entering specific coordinates; by panning the location of the map on the display screen; or by other known or hereinafter discovered methods.

The advantage of this algorithm is that it is very memory efficient and uses only the memory required to store what is necessary to be displayed at all ranges. The alternative would be to have all resolutions of topographical data for the whole Earth pulled and in graphics memory, and just to access and display what is selected. This is not practical in embedded avionics systems.

In avionics, size, power, weight, and processing speed are critical. It is desirable to provide elements having the least weight, consume the least power, and generate and display data immediately or at least within a short amount of time so that a pilot is supplied with necessary information as required. Embedded hardware and software systems used in avionics do not have the benefit of large amounts of memory and processing power as desktop computers do. In addition, the data must be displayed without much delay to the cockpit crews.

The terrain resolution database, from which data is retrieved and temporarily stored in RAM, is stored on a removable memory device, such as an Secure Digital (SD) memory card, in one embodiment. In other embodiments, the terrain database is stored on an internal hard drive or other non-removable memory device; other hardware external to, but operably connected to, the avionics device; or received via transmission, such as XM satellite.

It will be appreciated that the general inventive concept, as described herein, may be, and in certain embodiments is, used in conjunction with any or all of the general inventive concepts described in U.S. Provisional Patent Applications Ser. No. 61/228,601, entitled "LCD Display Dimming System and Method", Ser. No. 61/228,610, entitled "Reversionary Architecture System and Method", and Ser. No. 61/228,603, entitled "Pitot Pressure Sensing System and Method", all three filed Jul. 26, 2009, the entire disclosures of which are herein incorporated by reference, and also U.S. Provisional Patent Application Ser. No. 61/367,041, entitled "Avionics Display", filed Jul. 23, 2010, and 61/367,058, entitled "Avionics Display", both filed Jul. 23, 2010, the entire disclosures of which are herein incorporated by reference.

Various other embodiments of the present general inventive concept can be embodied as computer readable codes on a computer readable medium and/or computer readable recording medium (collectively "computer readable recording medium" hereafter). The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

Thus, while the present general inventive concept has been shown in the drawings and fully described above with particularity and detail in connection with what is presently deemed to be the most practical and preferred embodiment (s) of the invention, it will be apparent to those of ordinary skill in the art that many modifications thereof may be made without departing from the principles and concepts set forth herein, including, but not limited to, variations in size, materials, shape, form, function and manner of operation, assembly and use.

It is also to be understood that the following claims are intended to cover all of the generic and specific features of the invention herein described, and all statements of the scope of the invention which, as a matter of language, might be said to fall there between. Hence, the proper scope of the present general inventive concept should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A method of displaying information on an avionics device display, said method comprising steps of:
retrieving topographical data from a database boated on an aircraft based on a location of an aircraft and limited in range, wherein said topographical data includes a plurality of terrain resolutions, each terrain resolution including a geographic range;
storing said topographical data in RAM;
optimizing topographical data of one terrain resolution for display on a device display screen; and
displaying optimized topographical data of said one terrain resolution on said device display screen.

2. The method of claim 1, further comprising:
monitoring the location of an aircraft; and
updating said topographical data stored in RAM to include topographical data within a predetermined range with respect to the location of the aircraft.

3. The method of claim 2, wherein each geographic range of each terrain resolution includes a predetermined range with respect to the location of the aircraft.

4. The method of claim 2, wherein said updating said topographical data stored in RAM occurs at regular intervals.

5. The method of claim 4, wherein said regular intervals comprise 5 minute intervals.

6. The method of claim 1, further comprising:
transitioning from a first screen resolution to a second screen resolution incrementally according to a time function.

7. The method of claim 6, wherein said time function is linear, exponential, or double exponential over constant time.

8. The method of claim 6, wherein while transitioning from said first screen resolution to said second screen resolution, said optimizing topographical data of said one terrain resolution switches to optimizing topographical data of a second terrain resolution; and said displaying optimized topographical data of said one terrain resolution switches to displaying optimized topographical data of said second terrain resolution.

\* \* \* \* \*

UNITED STATES PATENT AND TRADEMARK OFFICE
CERTIFICATE OF CORRECTION

| | |
|---|---|
| PATENT NO. | : 11,150,105 B2 |
| APPLICATION NO. | : 16/859629 |
| DATED | : October 19, 2021 |
| INVENTOR(S) | : Sean Rieb et al. |

It is certified that error appears in the above-identified patent and that said Letters Patent is hereby corrected as shown below:

In the Claims

In Column 12, Line 41, in Claim 1, delete "boated" and insert --located--

Signed and Sealed this
Twenty-fourth Day of May, 2022

*Katherine Kelly Vidal*

Katherine Kelly Vidal
*Director of the United States Patent and Trademark Office*